United States Patent
Parker et al.

[11] Patent Number: 5,839,548
[45] Date of Patent: Nov. 24, 1998

[54] MOTION CONTROL DEVICE FOR ROTARY DAMPERS

[75] Inventors: Eric G. Parker, Elgin; Steven L. Bivens, Kankakee, both of Ill.

[73] Assignee: Illinois Tool Works Inc., Glenview, Ill.

[21] Appl. No.: 708,816

[22] Filed: Sep. 9, 1996

Related U.S. Application Data

[63] Continuation-in-part of Ser. No. 550,380, Oct. 30, 1995, Pat. No. 5,690,184.

[51] Int. Cl.$^6$ ..................................................... F16D 63/00
[52] U.S. Cl. ................................................. 188/82.1; 16/64
[58] Field of Search ................................. 188/82.1, 82.8, 188/290, 82.7, 82.77; 16/64, 66, 69, 82, 84, 353; 192/20, 82 P

[56] References Cited

U.S. PATENT DOCUMENTS

| | | |
|---|---|---|
| 396,188 | 1/1889 | Anderson . |
| 1,526,395 | 2/1925 | Swanson ........................................ 16/64 |
| 1,595,723 | 8/1926 | Norton . |
| 2,664,183 | 12/1953 | Payne ........................................ 188/82.1 |
| 4,691,811 | 9/1987 | Arakawa et al. ........................ 188/290 |
| 4,872,239 | 10/1989 | Ferguson et al. ........................... 16/64 |

FOREIGN PATENT DOCUMENTS

| | | | |
|---|---|---|---|
| 66272 | 6/1956 | France ..................................... | 188/82.1 |
| 949272 | 8/1956 | Germany ................................ | 188/82.1 |
| 2902715 | 4/1980 | Germany ................................ | 188/82.1 |
| 130767 | 2/1951 | Sweden .................................. | 188/82.1 |

*Primary Examiner*—Peter M. Poon
*Attorney, Agent, or Firm*—Schwartz & Weinrieb

[57] ABSTRACT

A one-way damping system is provided for dampening the movement of a closure member when the closure member is moved in a first direction toward its opened position such that the closure member is opened at a controlled rate of speed, and for permitting the closure member to be moved in a second direction toward its closed position such that the closure member is able to be closed at an undampened or unrestricted rate of speed. The closure member includes a gear rack integrally molded therewith, and a rotary damper gear is movable into engagement with and out of engagement from the gear rack in order to provide the dampened and undampened movement modes. An idler gear or a pair of control arms are operatively associated with the rotary damper gear so as to ensure proper engagement and disengagement of the rotary damper gear with respect to the gear rack.

18 Claims, 7 Drawing Sheets

FIG. 10a

MOTION CONTROL DEVICE FOR ROTARY DAMPERS

CROSS-REFERENCE TO RELATED PATENT APPLICATIONS

This patent application is a Continuation-in-Part (CIP) patent application of U.S. patent application Ser. No. 08/550,380 now U.S. Pat. No. 5,690,114, which was filed on Oct. 30, 1995 in the name of Eric G. Parker and Steven L. Bivens and which is assigned to ILLINOIS TOOL WORKS INC. which is also the assignee of the present patent application.

FIELD OF THE INVENTION

The present invention relates generally to rotary dampers for dampening the opening movement of an openable object or closure member, such as, for example, an ashtray, a cupholder, a glove compartment door, or the like, relative to a main support body or housing, and more particularly, to a pivotable rotary gear damper which is operatively associated with the openable object or closure member such that when the openable object or closure member is opened, it is opened in a gently or smoothly controlled manner at a dampened or controlled rate of speed, and alternatively, when the openable object or closure member is closed, it is able to be closed at an undampened, and usually greater, rate of speed.

BACKGROUND OF THE INVENTION

It is generally known in the movable closure art that damper devices can be operatively incorporated into the closure mounting system as a mechanism or means for controlling the opening and closing of closure doors and drawers in order to effectively eliminate or substantially reduce noise, shock forces, damage to component parts of the system, or other inconveniences or annoyances which may otherwise be generated attendant an opening or closing operation of the particular closure. For example, when the openable object or closure member comprises a glove compartment door installed within the dashboard of an automotive vehicle, the sudden impact developed as a result of portions of the glove compartment door encountering portions of the glove compartment housing at the end of the travel movement of the glove compartment door when the glove compartment door is moved to its opened position may cause some of the contents of the glove compartment to be discharged from the glove compartment and into the passenger seating area. In order to avoid such occurrences, and as has been noted briefly hereinbefore, there have been provided in the art different types of damper devices for controlling the movement of such closure devices or components whereby such shock or impact forces are effectively reduced or eliminated.

One type of one-way dampening device, in connection with which an openable object or closure member is opened in a first direction of movement at a dampened rate of speed, and is closed in a second direction of movement at an undampened rate of speed, is disclosed within the aforenoted related patent application. More particularly, as can be appreciated from FIGS. 1–4 of the drawings, the one-way dampening device of such prior patent application is generally indicated by the reference character 10 and is seen to comprise a pivotable bracket or support means 12 having a toothed driven gear 14 of a rotary damper, not shown, mounted thereon, and an operatively associated gear rack 16. When the openable object or closure member comprises, for example, a glove compartment door, one end of the gear rack 16 is fixedly attached to a wall portion of the glove compartment door assembly. An aperture 18 is formed within the bracket 12 such that the bracket 12 can be pivotally mounted by means of a suitable fastener, passing through aperture 18, upon a stationary wall portion of the glove compartment housing, not shown, which may in turn be mounted within the dashboard of an automotive vehicle.

Figures 1, 4:
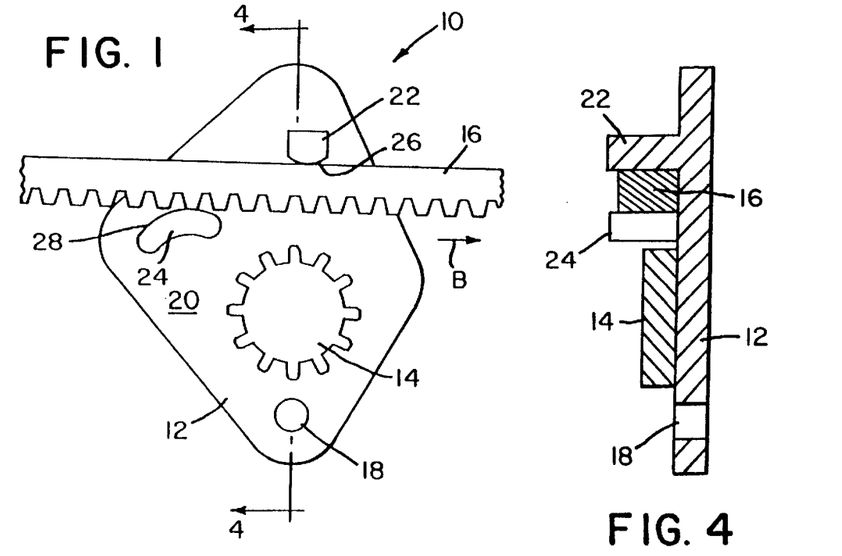
FIG. 1 is a side elevational view of the rotary damper gear system of the aforenoted parent patent application illustrating the disposition of the structural components thereof when the closure member is being moved toward the closed position in the direction of arrow B.
FIG. 4 is a cross-sectional view of the rotary damper gear system of the aforenoted parent patent application as illustrated in FIG. 1 and as taken along the line 4—4 of FIG. 1.
Figure 2:
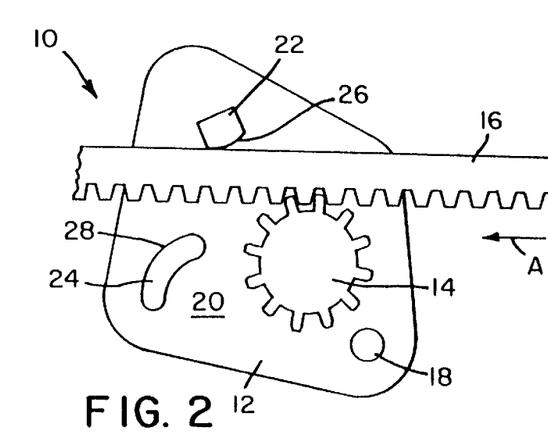
FIG. 2 is a side elevational view, similar to that of FIG. 1, of the rotary damper gear system of the aforenoted parent patent application illustrating, however, the disposition of the structural components thereof when the closure member is being moved toward the open position in the direction of arrow A.
Figure 3:
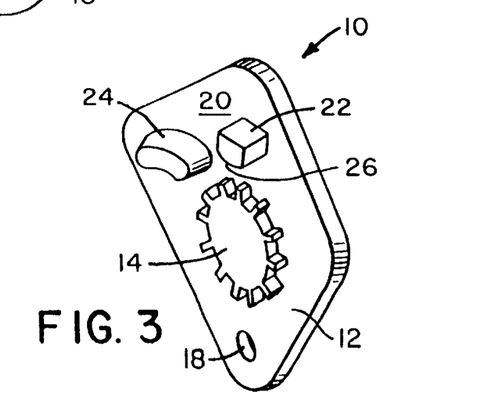
FIG. 3 is a perspective view of the rotary damper gear component of the system of the aforenoted parent patent application as illustrated in FIGS. 1 and 2.

The bracket 12 includes a main surface 20 upon which the toothed driven gear 14 is rotatably mounted, and a guide pin 22, having an arcuate or convex surface 26, and a cam member 24, having a similar arcuate or convex surface 28, are fixedly mounted upon the surface 20. The operation of the dampening system or device can best be appreciated from FIGS. 1 and 2. It is initially noted that the left distal end of the gear rack 16 is attached to the wall portion of the glove compartment door assembly, and that the disposition of the various components of the dampening system or device 10 corresponding to the closed position of the glove compartment door or closure is shown in FIG. 1. Consequently, when the glove compartment door or closure is to be opened, the gear rack 16 is pivotally moved from right to left in the direction of arrow A as shown in FIG. 2. As a result of such movement, the interengagement of gear rack 16 and cam member 24 causes bracket 12 to be pivotally rotated in the counterclockwise direction about the pivot point 18 so as to in turn cause the guide pin 22 to follow a path of movement defined by an arcuate locus as may be appreciated from the two views comprising FIGS. 1 and 2. The arcuate or convex surface 26 of guide pin 22 disposed in contact with the non-toothed side of the gear rack 16 will cause the toothed side of the gear rack 16 to be enmeshed with the toothed gear 14 of the rotary damper. Therefore, as the glove compartment door or closure is moved toward its fully opened position, the gear rack 16 drives toothed gear 14 whereby a dampening effect is effectively applied to or impressed upon the gear rack 16 so as to gently or smoothly retard the opening movement of the glove compartment door or closure assembly in a dampened manner and at a controlled rate of speed.

Conversely, when the glove compartment door or closure assembly is to be moved from its opened position shown in FIG. 2 back toward the closed position shown in FIG. 1, the gear rack 16 is moved from left to right as indicated by means of the arrow B shown in FIG. 1. Consequently, as a result of the engagement or abutment between the non-toothed side of gear rack 16 and guide pin 22, bracket 12 is rotatably pivoted in the clockwise direction whereby the cam member 24 is positionally moved through an arcuate locus as can be appreciated from a comparison of FIGS. 1 and 2. The convex or arcuate surface 28 of the cam member 24 thus engages the toothed side of the gear rack 16 thereby forcing the latter to be disengaged from its previous enmeshed engagement with the toothed driven gear 14. Therefore, when the glove compartment door or closure assembly undergoes movement toward its closed position, no dampening or retarding force is impressed upon or applied thereto since the gear rack 16 has been effectively disengaged from the toothed gear 14 of its operatively associated rotary damper, and the glove compartment door or closure assembly is closed at an undampened rate of speed.

While the one-way dampening device just described in connection with FIGS. 1 and 2 of tile drawings, and as more specifically disclosed and described within the aforenoted patent application Ser. No. 08/550,380, is quite satisfactory, has proven to be commercially successful, and was developed in accordance with an objective toward being relatively compact and satisfying space constraints normally encountered in connection with the mounting, placement, or accommodation of, for example, such glove compartment door assemblies and their glove box housings within automotive vehicle dashboards, such space constraints or requirements are such as to require additional improvements or refinements to be made to the dampening device or structural system comprising the same, particularly in connection with those components of the device or system which are mounted upon or operatively associated with the openable object or closure member and its associated housing.

OBJECTS OF THE INVENTION

Accordingly, it is an object of the present invention to provide a new and improved one-way pivoting gear damper which is relatively simple and economical to manufacture and assemble, and yet also exhibits enhanced compactness in order to satisfy existing space constraints characteristic of, for example, current automotive vehicle glove compartment door or closure assemblies.

Another object of the present invention is to provide a new and improved one-way pivoting gear damper wherein the toothed driven gear of the rotary damper is always able to be properly aligned or positioned with respect to, and engaged with, the gear rack so as to achieve dampening of the openable object or closure member when the openable object or closure member is moved in a first, opened direction such that the openable object or closure member is opened in a dampened manner and at a controlled rate of speed, and yet is able to be properly disengaged from the gear rack so as to permit the openable object or closure member to be moved in a second opposite, closed direction such that the openable object or closure member is closed at an unrestricted or undampened rate of speed.

SUMMARY OF THE INVENTION

The foregoing and other objects of the present invention are achieved in accordance with the present invention through the provision of various embodiments of new and improved motion control devices for rotary dampers wherein, in lieu of the gear rack having one end thereof fixed to the closure member as in the case of the aforenoted parent patent application, the gear rack is fixedly mounted upon the closure member, such as, for example, by being integrally molded therewith. In addition, in accordance with a first embodiment of the present invention, the rotatably driven or rotary damper gear is rotatably mounted upon a distal end of a support arm which is pivotably mounted upon the closure housing such that when the closure member is moved toward the open position, the support arm pivots downwardly toward the gear rack whereby the rotatably driven or rotary damper gear is forced into enmeshed engagement with the gear rack thereby causing the closure member to be opened in a dampened manner and at a controlled rate of speed. When the closure member is moved toward its closed position, the pivotable support arm is caused to pivot upwardly away from the gear rack such that the rotatably driven or rotary damper gear is forced out of enmeshed engagement with the gear rack whereby the rack and its associated closure member are able to be moved toward the closed position at an undampened or unrestricted rate of speed.

In accordance with a second embodiment of the present invention, in addition to the rotary damper gear being mounted upon its support arm, an idler gear is mounted upon a second support arm wherein both support arms are fixedly mounted upon the same pivotable support member, base, or plate such that the idler gear causes the rotary damper gear to be properly engaged with or disengaged from the gear rack depending upon the direction of movement of the closure member and its associated gear rack.

A third embodiment of the present invention comprises the mounting of the rotary damper gear and the idler gear upon a common lever arm which is pivotably mounted upon the closure housing by means of an arcuately curved slot or aperture defined within the lever arm. In this manner, the enmeshed engagement of the idler gear with the gear rack of the closure member causes the rotary damper gear to be engaged with or disengaged from the gear rack of the closure member so as to properly control the movement of the closure in its restricted or dampened and unrestricted or undampened modes, respectively, attendant the opening and closing of the closure member.

A fourth embodiment of the present invention comprises the rotatable mounting of the rotary damper gear upon the distal end of a support arm in a manner similar to the first embodiment of the present invention, however, in addition, the pivotal end of the support arm is coaxially mounted upon an idler gear which is rotatably mounted upon the closure housing and is disposed in enmeshed engagement with the gear rack of the closure member such that depending upon the direction of movement of the closure member and its associated gear rack, the rotary damper gear is pivoted into and out of enmeshed engagement with the gear rack so as to control the movement of the closure member in its restricted or dampened and unrestricted or undampened modes attendant the opening and closing of the closure member.

In accordance with a fifth embodiment of the present invention, the rotary damper gear and the idler gear are mounted upon a common link arm which is in turn pivotably mounted upon a support member, base, or plate. The link arm and the idler gear are coaxially mounted, while the rotary damper gear is mounted upon a distal end portion of the link arm, and as a result of the particular direction of movement of the closure member, the rotary damper gear is moved into or out of engagement with the gear rack so as to again control the movement of the closure member in its restricted or dampened and unrestricted or undampened modes attendant the opening and closing of the closure member.

Lastly, in accordance with a sixth embodiment of the present invention, the rotary damper gear is rotatably mounted upon the distal end of a primary support arm which is pivotably mounted upon the closure housing in a manner similar to that of the first embodiment of the present invention, however, in addition to such structure, there is also provided a pair of secondary arms which are disposed parallel to each other and which are fixedly mounted upon the primary support arm so as to extend substantially perpendicular to an axis of the support arm which extends between the pivot point or mounting of the support arm and the rotary axis of the rotary damper gear. Each secondary arm is provided at its respective distal end with a flexible finger which can comprise a one-way detent or barb which are operably disposed in opposite directions so that when the closure member and its associated gear rack is, for example, moved toward the open position, a first one of the flexible fingers will be engaged with the gear rack so as to in turn cause enmeshed engagement of the rotary damper gear with the gear rack whereby the closure member will be opened in a controlled, restricted, or dampened manner, whereas when the closure member and its associated gear rack is moved toward the closed position, the second one of the flexible fingers will be engaged with the gear rack so as to cause the rotary damper gear to be disengaged from the gear rack of the closure member whereby the closure member is able to be moved to the closed position in an unrestricted or undampened manner. In this latter mode, the first flexible finger also limits the extent to which the second flexible finger causes disengagement of the rotary damper gear from the gear rack of the closure member such that the rotary damper gear is maintained at a position which is within the vicinity of the gear rack so as to readily permit re-engagement of the rotary damper gear with the gear rack when the closure member is again moved toward its opened position so as to control the opening of the closure member in a dampened or restricted manner.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE ILLUSTRATED EMBODIMENTS

Figure 5A:
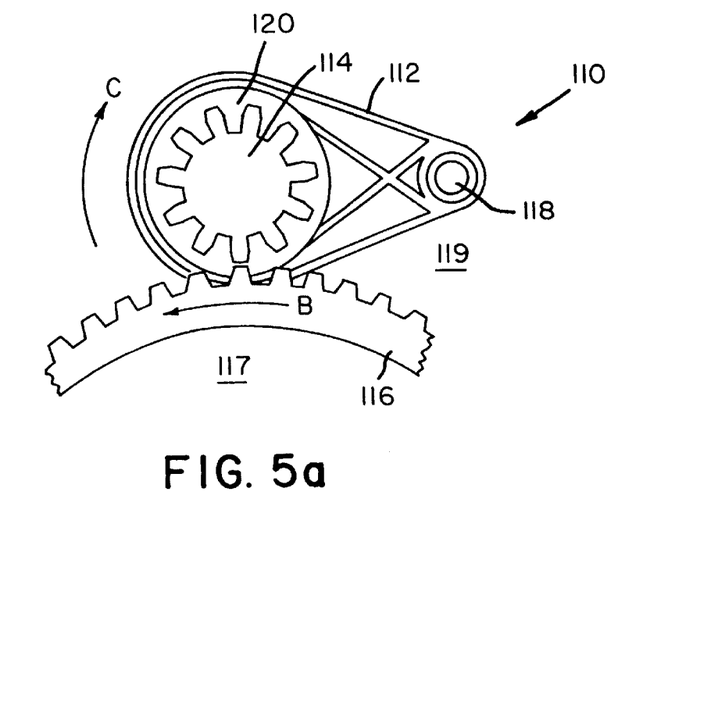
FIGS. 5a and 5b are side elevational views of a first embodiment of the new and improved rotary damper gear system constructed in accordance with the present invention and showing the cooperative parts thereof when the closure member is being respectively closed and opened.
Figure 5B:
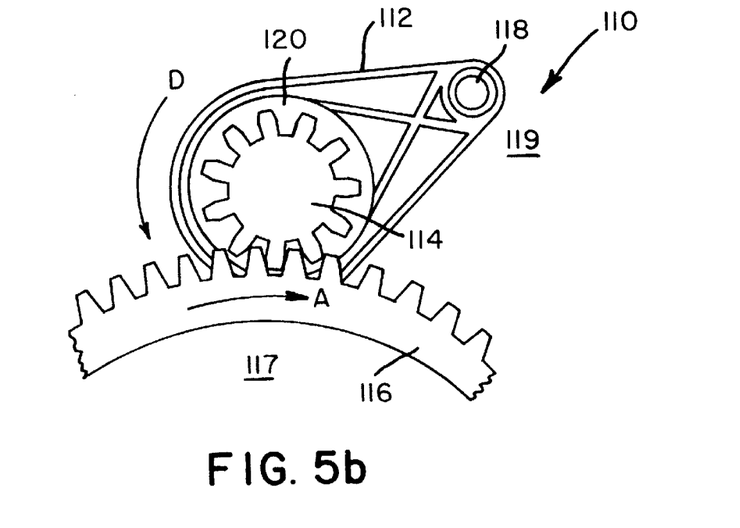

Referring again to the drawings, and more particularly to FIGS. 5a and 5b, a first embodiment of the new and improved rotary damper gear system constructed in accordance with the present invention is illustrated and designated by the reference character 110. It is to be noted that when reference is made to this first embodiment of the present invention as illustrated in FIGS. 5a and 5b, and when such embodiment is compared to the damper system 10 of FIGS. 1 and 2, similar reference characters are used to designate similar parts or components within the different embodiments except that the reference characters of this first embodiment of the present invention as illustrated in FIGS. 5a and 5b are denoted as being within the 100 series. More particularly, the system 110 comprises a toothed gear rack 116 which is adapted to be fixedly mounted upon a closure member 117 which may be, for example, an ashtray, glove compartment door, a cupholder, or other similar closure member or component conventionally found within an automotive interior or passenger cabin. More particularly, the toothed gear rack 116 has an arcuate configuration and may be integrally molded with the closure member 117.

As was the case of the rotary damper gear system of the parent patent application as disclosed within FIGS. 1 and 2, the rotary damper gear system 110 further comprises a toothed gear 114 which is operatively connected to a damper mechanism, not shown. A support arm or bracket 112 is provided with an aperture 118 by means of which the support arm or bracket 112 is pivotably mounted, by a suitable fastener, not shown, upon a stationary wall portion 119 of a closure housing which may be mounted within, for example, the dashboard or console of an automotive interior or passenger cabin. The support arm or bracket 112 is further provided upon a distal end portion thereof with a main surface 120 upon which the toothed gear 114 is rotatably mounted.

When the closure member 117 is to be moved from its closed position to its opened position, the closure member 117 and the gear rack 116 thereof are moved in the direction of arrow A as shown in FIG. 5b from the relative positions illustrated in FIG. 5a whereby it can be seen that as a result of the movement of the closure member 117 and the gear rack 116 in the direction of arrow A, the distal end portion of the support arm or bracket 112, upon which the toothed damper gear 114 is rotatably disposed, is pivoted downwardly in the counterclockwise direction as denoted by the arrow D. As a result of such movements of the gear rack 116 and the damper gear 114, the teeth of the damper gear 114 become enmeshed with the teeth of the gear rack 116 whereby the movement of the gear rack 116 is accordingly arrested, retarded, or dampened in accordance with the dampening resistance developed by the damper gear 114 as a result of its operative connection to its associated damper mechanism, not shown. In this manner, movement of the closure member 117, to which gear rack 116 is fixedly connected, is accordingly dampened or restricted whereby the closure member 117 is opened at a desired controlled rate of speed.

To the contrary, when the closure member 117 is to be moved from its opened position to its closed position, the closure member 117 and the gear rack 116 thereof are moved in the direction of arrow B as shown in FIG. 5a from the relative positions illustrated in FIG. 5b whereby it can be seen that as a result of the movement of the closure member 117 and the gear rack 116 in the direction of arrow B, the distal end portion of the support arm or bracket 112, upon which the toothed damper gear 114 is disposed, is pivoted upwardly in the clockwise direction as denoted by the arrow C. As a result of such movements of the gear rack 116 and the damper gear 114, the teeth of the damper gear 114 become disengaged from the teeth of the gear rack 116 whereby the movement of the closure member 117 in the closed direction is accordingly undampened or unrestricted such that the closure member 117 is able to be closed at an unrestricted or undampened rate of speed. It will be appreciated that the teeth of the gear rack 116 and the toothed damper gear 114 repeatedly encounter each other at their crest locations, without the teeth becoming enmeshed or engaged, as a result of the teeth of the gear rack 116 passing over the teeth of the damper gear 114, whereby noise or chatter may develop by means of such bumping or bouncing action. This undesirable result may be eliminated or substantially reduced by fabricating the toothed damper gear 114 from a suitable soft rubber material.

As has been noted hereinabove, as a result of the particular structure and relative disposition of the components of the first embodiment of the damper system disclosed within FIGS. 5a and 5b, during closure of the closure member 117 from its opened position to its closed position, the damper gear 114 will undergo or experience repetitive bumping or bouncing movements or action. This action occurs because the disposition of the toothed damper gear 114 is not effectively fixed relative to the gear rack 116 during the closure operation. Such a result, that is, fixation of the damper gear relative to the gear rack, is achieved by means of a second embodiment of a rotary damper gear system constructed in accordance with the present invention and designated generally by the reference character 210 as seen in FIGS. 6a and 6b, it being noted that component parts of this embodiment which are similar to those of the previously described embodiments are designated by similar reference characters except that such reference characters are in the 200 series.

Figure 6A:
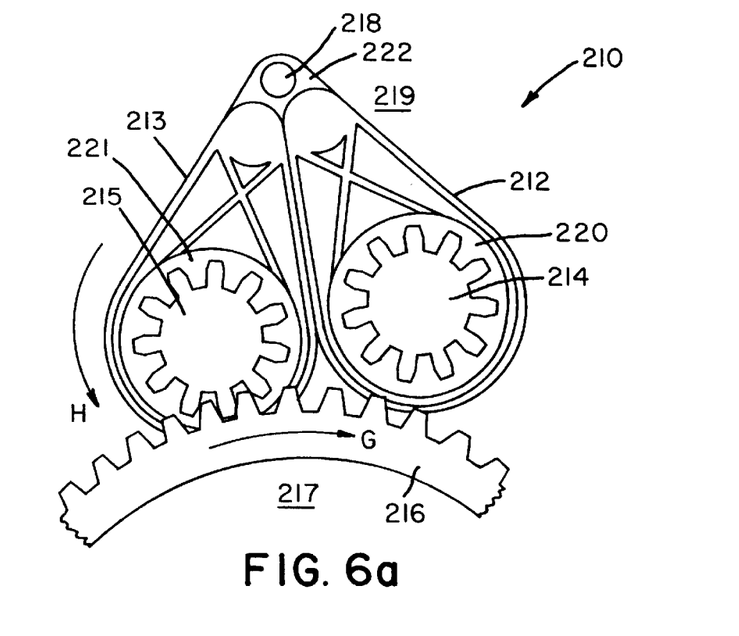
FIGS. 6a and 6b are side elevational views of a second embodiment of the new and improved rotary damper gear system constructed in accordance with the present invention and showing the cooperative parts thereof when the closure member is being respectively closed and opened.
Figure 6B:
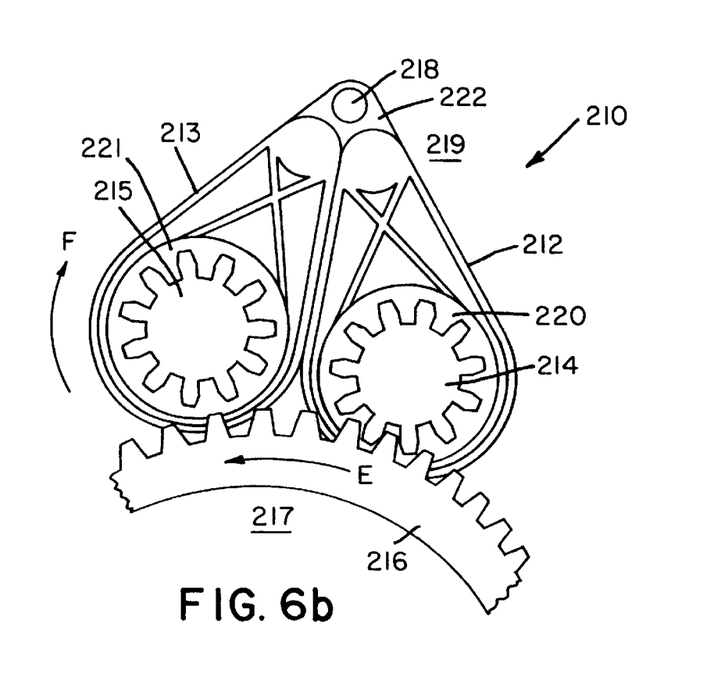

With reference therefore being made to FIGS. 6a and 6b, it is appreciated that as was the case with the first embodiment of the present invention as disclosed in FIGS. 5a and 5b, the toothed rotary damper gear 214 of this embodiment is rotatably mounted upon a main surface portion 220 of a support arm or bracket 212, however, in addition to such structure, the system 210 of this second embodiment of the present invention further comprises a second support arm or bracket 213. Both support arms or brackets 212 and 213 are fixedly mounted upon a common base or plate member 222 which is provided with an aperture 218 through which a suitable fastener, not shown, may be passed for pivotably mounting the base or plate member 222 upon a suitable wall portion of a closure housing 219. The support arm or bracket 213 similarly comprises a main surface portion 221 upon which an idler gear 215 is rotatably mounted. The purpose of providing the idler gear 215 in conjunction with the damper gear 214 is to alternatively ensure rotary enmeshed engagement of the damper gear 214 with the gear rack 216 or the relatively fixed disengagement of the damper gear 214 with respect to the gear rack 216.

More particularly, when the closure member 217 is to be opened, the components of the system 210 will be moved from their relative positions of FIG. 6a, corresponding to the closed state of the closure member 217, to those of FIG. 6b corresponding to the opened state of the closure member 217. Specifically, when the closure member 217 is opened, the gear rack 216 is moved in the direction of arrow E as seen in FIG. 6b whereby as a result of the initial enmeshed engagement of the idler gear 215 and the gear rack 216, as seen in FIG. 6a, the base or plate member 222 is pivotably moved in the clockwise direction as denoted by the arrow F of FIG. 6b. As a result of such movement, the support arms or brackets 212 and 213, which are fixed upon the base or plate member 222, are likewise moved or pivoted in the clockwise direction such that the rotary damper gear 214 is brought into enmeshed engagement with the gear rack 216 while the idler gear 215 is disengaged from its enmeshed engagement with the gear rack 216. Since the rotary damper gear 214 is now engaged with the gear rack 216, opening of the closure member 217 in the direction of arrow E is smoothly achieved or accomplished at a dampened, controlled, or restricted rate of speed as desired. It is thus appreciated that during the opening operation of the closure member 217, the idler gear 215 ensures the controlled engagement of the rotary damper gear 214 with the gear rack 216.

Conversely, when the closure member 217 is to be returned to its closed position as shown in FIG. 6a, from its opened position shown in FIG. 6b, the closure member 217 is pivotably moved in the direction of arrow G as seen in FIG. 6a whereby as a result of the initial enmeshed engagement of the rotary damper gear 214 with the gear rack 216 attendant the opening of the closure member 217, the base or plate member 222 is pivoted in the counterclockwise direction as denoted by the arrow H in FIG. 6a such that the idler gear 215 now becomes enmeshed with the gear rack 216 while the rotary damper gear 214 is disengaged from the gear rack 216. Since the idler gear 215 does not perform any dampening function, and since rotary damper gear 214 is disengaged from the gear rack 216, the closure member 217 is able to be moved to its closed position at an undampened or unrestricted rate of speed. It is to be further appreciated that when the idler gear 215 is enmeshed with the gear rack 216 during the closure of the closure member 217, the relative position of the rotary damper gear 214 with respect to the gear rack 216 is fixed, as a result of the idler and damper gears 215 and 214 being mounted upon base or plate member 222, whereby chatter, noise, bouncing, or bumping of the damper gear 214 with respect to or in contact with the gear rack 216 is effectively eliminated.

Figure 7A:
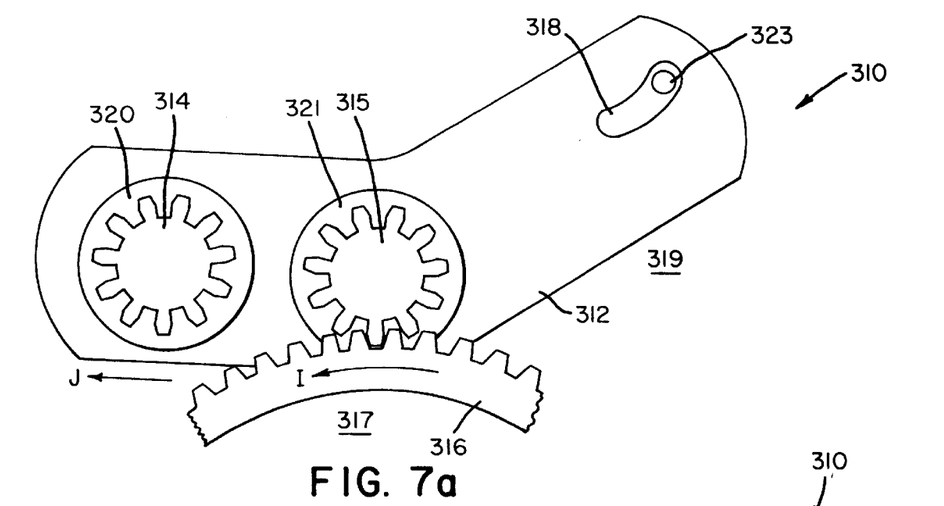
FIGS. 7a and 7b are side elevational views of a third embodiment of the new and improved rotary damper gear system constructed in accordance with the present invention and showing the cooperative parts thereof when the closure member is being respectively closed and opened.
Figure 7B:
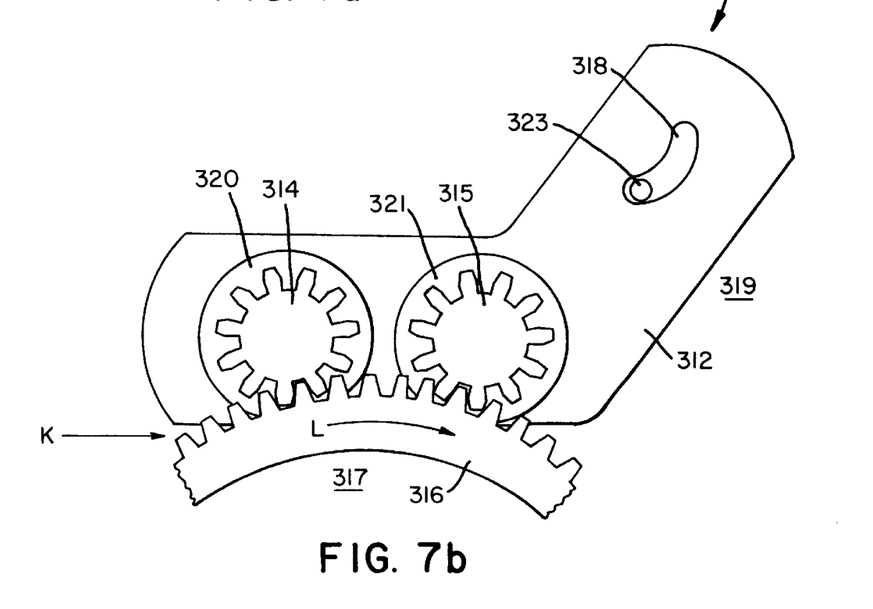

Turning now to FIGS. 7a and 7b, a third embodiment of a new and improved rotary damper gear system constructed in accordance with the present invention is illustrated and designated by the reference character 310, it being noted that component parts of this embodiment which are similar to corresponding parts of the previous embodiments will be designated by similar reference characters except that such reference characters will be in the 300 series. As can be seen from FIGS. 7a and 7b, this third embodiment of the rotary damper gear system 310 of the present invention is somewhat similar to the second embodiment 210 of the present invention as illustrated in FIGS. 6a and 6b in that the system 310 comprises both a rotary damper gear 314 and an idler gear 315 rotatably mounted upon their respective main surface portions 320 and 321, however, it is further seen that in accordance with this embodiment, the rotary damper gear 314 and the idler gear 315 are mounted upon a common lever arm 312. In addition, the lever arm 312 is provided with an arcuately shaped aperture 318 through which passes a suitable fastener 323 by means of which the lever arm 312 is pivotably mounted upon the closure housing 319.

The basic operation of this third embodiment 310 of the rotary damper gear system of the present invention is seen to be quite similar to that of the second embodiment 210 of the rotary damper gear system of the present invention except that in accordance with this third embodiment 310 of the invention, while the rotary damper and idler gears 314 and 315 may be alternatively enmeshed with the gear rack 316 depending upon whether or not the closure member 317 is being opened or closed, the idler gear 315 is preferably maintained enmeshed with the gear rack 316. More specifically, FIGS. 7a and 7b disclose the relative disposition of the various component parts of the rotary damper system 310 when the closure member 317 is disposed in its closed and opened states, respectively. Consequently, when it is desired to move the closure member 317 from its closed state illustrated in FIG. 7a to its opened state illustrated in FIG. 7b, the closure member 317 is moved such that the gear rack 316 undergoes arcuate movement in the clockwise direction of arrow L as seen in FIG. 7b whereby as a result of the enmeshed engagement of the idler gear 315 with the gear rack 316, as well as the pivotable mounting of the lever arm 312 upon the wall portion 319 of the closure housing by means of the fastener 323 and the arcuately shaped aperture 318, the lever arm 312 is in effect translated from its position shown in FIG. 7a to that shown in FIG. 7b as designated by means of the arrow K shown in FIG. 7b. As a result of such translational movement of the lever arm 312, rotary damper gear 314 becomes enmeshed with the gear rack 316 whereby the opening movement of the closure member 317 is now dampened or restricted such that the closure member 317 is smoothly opened at a controlled rate of speed. It is thus seen that in a manner similar to that of the second embodiment of the present invention as illustrated in FIGS. 6a and 6b, the presence or provision of the idler gear 315 ensures the proper or controlled enmeshed engagement of the rotary damper gear 314 with the gear rack 316 during the opening phase or operation of the closure member 317.

Conversely, when the closure member 317 is to be moved from its opened position of FIG. 7b to its closed position of FIG. 7a, the closure member is moved such that the gear rack 316 is pivoted in the counterclockwise direction of arrow I as shown in FIG. 7a. Again, as a result of the enmeshed engagement of the idler gear 315 with the gear rack 316, as well as the provision of the arcuate slot or aperture 318 with respect to fastener 323 and closure housing wall portion 319, lever arm 312 is able to undergo translational movement in the direction of arrow J as seen in FIG. 7a whereby rotary damper gear 314 is disengaged from gear rack 316. In this manner, closure of the closure member 317 is achieved at an undampened or unrestricted rate of speed, and in addition, in view of the engagement of the idler gear 315 with the gear rack 316, the disengagement of the damper gear 314 with respect to or from the gear rack 316, and the mounting of both the rotary damper gear 314 and the idler gear 315 upon the common lever arm 312, the rotary damper gear 314 is positively maintained out of engagement with respect to the gear rack 316 such that the aforenoted noise, chatter, bouncing, or bumping is effectively eliminated.

Figure 8A:
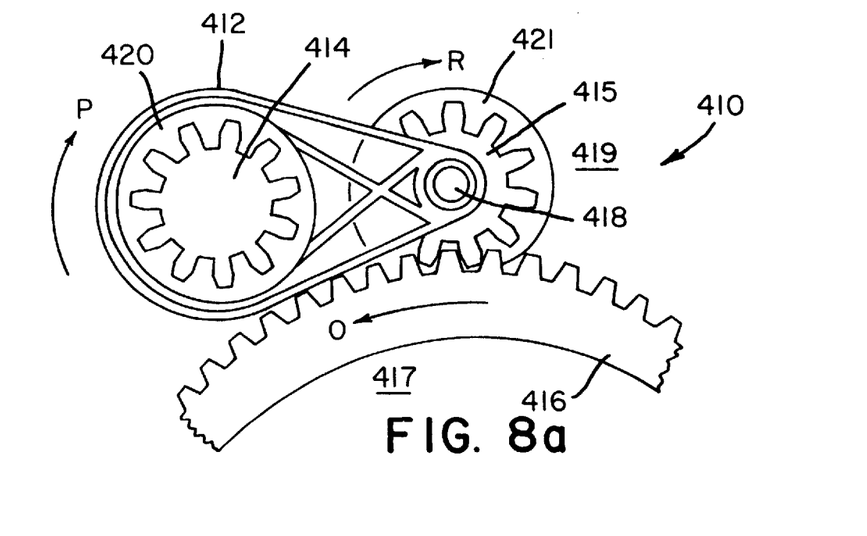
FIGS. 8a and 8b are side elevational views of a fourth embodiment of the new and improved rotary damper gear system constructed in accordance with the present invention and showing the cooperative parts thereof when the closure member is being respectively closed and opened.
Figure 8B:
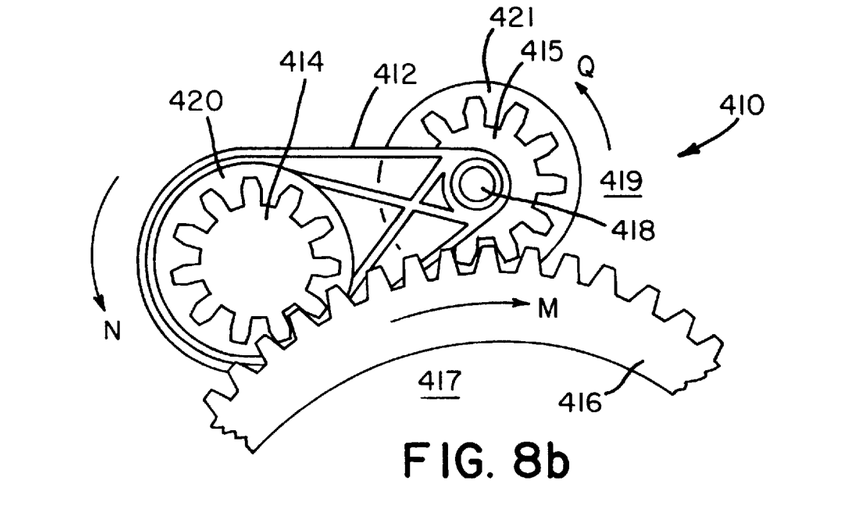

With reference now being made to FIGS. 8a and 8b, a fourth embodiment of a new and improved rotary damper gear system constructed in accordance with the present invention is disclosed and is designated by the reference character 410, it being noted that in connection with the discussion and description of this fourth embodiment 410 or the system of the present invention, all component parts similar to those corresponding component parts illustrated and described in connection with previous embodiments of the invention will be designated by similar reference characters except that such reference characters of this fourth embodiment 410 will be in the 400 series. It is appreciated that the fourth embodiment 410 of the damper system of the present invention is somewhat similar to the first embodiment 110 of the damper system of the present invention as illustrated in FIGS. 5a and 5b in that a rotary damper gear 414 is rotatably mounted upon a main surface portion 420 which is, in turn, defined upon a support arm or bracket 412, however, in lieu of the support arm or bracket 412 being freely pivotable upon the wall portion 419 of the closure housing by means of a suitable fastener, not shown, passing through the aperture 418 of the support arm or bracket 412, the pivotal end of the support arm or bracket 412, as defined by means of aperture 418, is coaxially mounted upon the wall portion 419 of the closure housing through means of a rotary idler gear 415 which is enmeshed with the gear rack 416. It is to be further appreciated that the mounting of the pivotal end of the support arm or bracket 412, as defined by means of its aperture 418 and the fastener, not shown, passing therethrough, with respect to the idler gear 415 comprises, in effect, a friction-type fitting such that when the idler gear 415 is rotated or pivoted in either the clockwise or counter-clockwise direction attendant the closing or opening of the closure member 417, respectively, the support arm or bracket 412 is caused to pivot or rotate therewith.

Consequently, when the closure member 417 is to be moved from its closed position as illustrated in FIG. 8a to its opened position as illustrated in FIG. 8b, the closure member 417 is moved so that the gear rack 416 is rotated or pivoted in the clockwise direction as denoted by the arrow M as seen in FIG. 8b, and the idler gear 415 is accordingly rotated or pivoted in the counterclockwise direction as denoted by the arrow Q. As a result of the friction-fitting defined between the pivotal end of the support arm or bracket 412 and the idler gear 415, the support arm or bracket 412 and the rotary damper gear 414 rotatably mounted thereon are rotated or pivoted in the counterclockwise direction as designated by the arrow N such that the rotary damper gear is forced into enmeshed engagement with the gear rack 416. It is thus again appreciated that the disposition, provision, or presence of the idler gear 415 as being enmeshed with the gear rack 416 causes or ensures the proper enmeshed engagement of the rotary damper gear 414 with respect to the gear rack 416 whereby the opening of the closure member 417 is smoothly performed or achieved in a controlled or dampened manner as dictated by rotary damper gear 414 and its associated damper mechanism, not shown.

Alternatively, when the closure member 417 is to be moved from its opened position or state shown in FIG. 8b to its closed position or state shown in FIG. 8a, the movement of the closure member 417 causes the gear rack 416 to be rotated or pivoted in the counterclockwise direction as designated by the arrow O in FIG. 8a whereby the idler gear 415 is rotated or pivoted in the clockwise direction as denoted by the arrow R. Again, as a result of the friction-type fitting defined between the pivotal end of the support arm or bracket 412 and the idler gear 415, the support arm or bracket 412, upon which the rotary damper gear 414 is rotatably mounted, is rotated or pivoted in the clockwise direction as designated by the arrow P whereby the rotary damper gear 414 is effectively and positively disengaged from the gear rack 416. In this manner, the closure member 417 is able to be moved from its opened position to its closed position at an undampened or unrestricted rate of speed. It is also noted that in a manner similar to those of the embodiments of FIGS. 6a,6b and 7a,7b, the rotary damper gear 414 is maintained disengaged from the gear rack 416 when the closure member 417 is being closed such that the aforenoted chatter, noise, bumping, or bouncing does not occur.

Figure 9A:
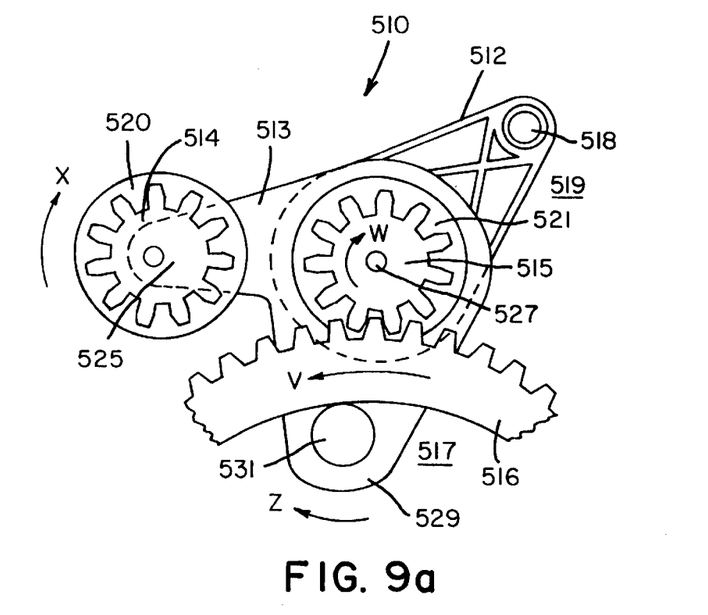
FIGS. 9a and 9b are side elevational views of a fifth embodiment of the new and improved rotary damper gear system constructed in accordance with the present invention and showing the cooperative parts thereof when the closure member is being respectively closed and opened.
Figure 9B:
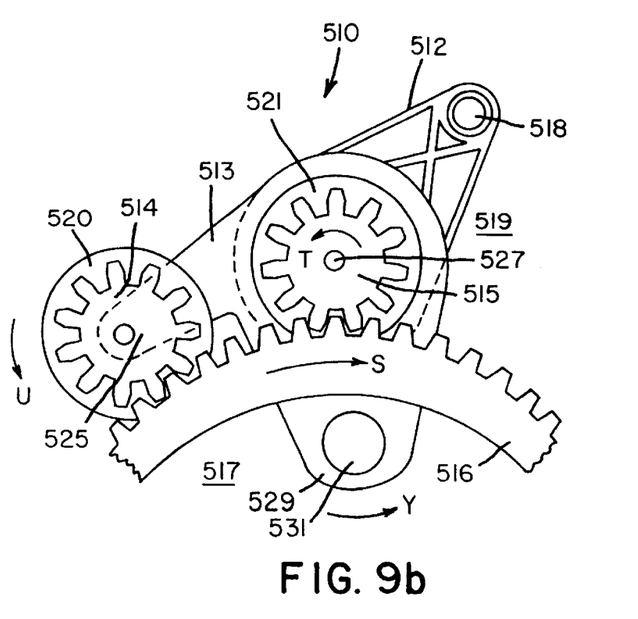

With reference now being made to FIGS. 9a and 9b, a fifth embodiment of a new and improved rotary damper gear system as constructed in accordance with the present invention is illustrated and generally designated by the reference character 510, it being noted that component parts of this embodiment which are similar to corresponding parts of the previous embodiments will be designated by similar reference characters except that such reference characters will be in the 500 series. More particularly, this fifth embodiment 510 of a rotary damper gear constructed in accordance with the present invention is seen to comprise a support arm or bracket 512 which is provided with an aperture 518 through which a suitable fastener, not shown, is adapted to be passed or inserted such that the support arm or bracket 512 is fixedly mounted upon the wall portion 519 of the closure housing. A lever or link arm 513 is pivotably mounted upon the stationary support arm or bracket 512, and a rotary idler gear 515 and a rotary damper gear 514 are respectively mounted upon the lever or link arm 513 with the damper gear 514 rotatably mounted upon a distal end of one leg 525 of the lever or link arm 523 while the idler gear 515 is coaxially mounted by means of a friction-type fitting with the lever or link arm 513 about its pivot point 527 so as to be enmeshed with gear rack 516. A stopper member 531 is also fixedly mounted upon another leg 529 of the lever or link arm 523.

Accordingly, when the closure member 517 is to be opened from its closed position shown in FIG. 9a to its opened position shown in FIG. 9b, the closure member 517 is moved so that the gear rack 516 undergoes arcuate movement in the clockwise direction as designated by arrow S in FIG. 9b. This movement of the gear rack 516 causes counterclockwise movement of the idler gear 515 enmeshed therewith, as indicated by the arrow T, and as a result of the friction-type mounting of the idler gear 515 upon the lever or link arm 513, the latter is likewise caused to undergo counterclockwise movement, as indicated by the arrow Y, whereby the rotary damper gear 514 similarly moves in the direction of arrow U into enmeshed engagement with the gear rack 516. Consequently, the rotational or pivotal movement of the gear rack 516 is dampened or retarded whereby its associated closure member 517 is moved to the opened position or state in a desirably dampened or controlled manner, it again being noted that the idler gear 515 and lever or link arm 513 arrangement in conjunction with the rotary damper gear 514 ensures the proper enmeshed engagement of the rotary damper gear 514 with the gear rack 516 during the opening phase of the closure member 517.

When the closure member 517 is to be moved from its opened position shown in FIG. 9b to its closed position shown in FIG. 9a, movement of the closure member 517 toward its closed position causes gear rack 516 to be rotated or pivoted in the counterclockwise direction as indicated by the arrow V in FIG. 9a whereby idler gear 515 is caused to rotate or pivot in the clockwise direction as indicated by the arrow W in FIG. 9a. This rotational or pivotal movement of the idler gear 515 and its mounting upon the lever or link arm 513 causes or ensures the fact that the rotary damper gear 514 will be properly disengaged and maintained separated from the gear rack 516 whereby closure of the closure member 517 from its opened position or state to its closed position or state is achieved in an undampened or unrestricted manner and without generating any chatter, noise, bouncing, or bumping. The provision of the stopper member 531 upon the distal end of leg 529 of the lever or link arm 513 limits the amount of rotational or pivotal movement of the leg 529, during the closure phase of the closure member 517 as a result of the engagement of the stopper member 531 with the non-toothed side of the gear rack 516 as seen in FIG. 9a, and therefore that of the lever or link arm 513, with respect to the support arm or bracket 512 so as to properly dispose rotary damper gear 514 at its disengaged position with respect to gear rack 516. It is noted that during the opening phase of the closure member 517, the stopper member 531 is not, and need not be, engaged, with the non-toothed portion of the gear rack 516 so as to limit the pivotable movement of the lever or link arm 513 and its leg portion 529 because the enmeshed engagement of the rotary damper gear 514 with the gear rack 516 in fact limits such pivotable movement of the lever or link arm 513.

Figure 10A:
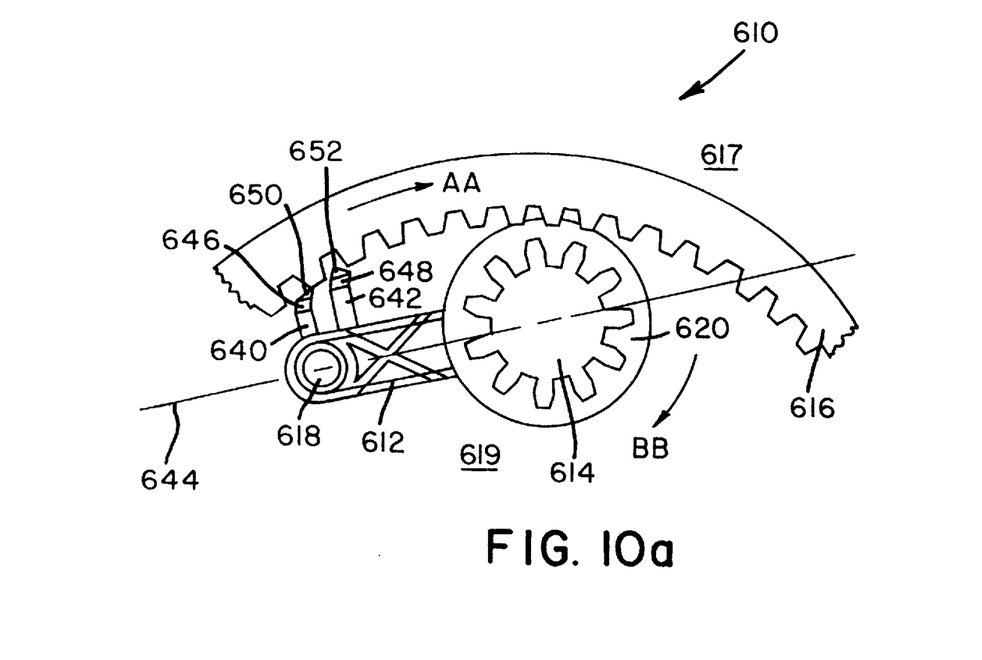
FIGS. 10a and 10b are side elevational views of a sixth embodiment of the new and improved rotary damper gear system constructed in accordance with the present invention and showing the cooperative parts thereof when the closure member is being respectively closed and opened.
Figure 10B:
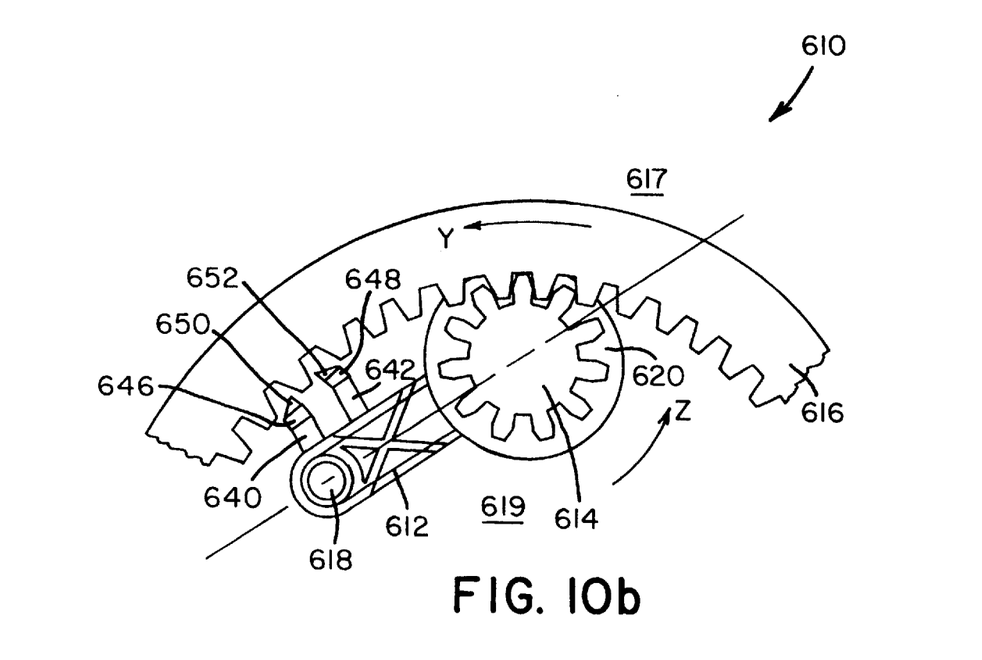

With reference lastly being made to FIGS. 10a and 10b, a sixth embodiment of a new and improved rotary damper gear system as constricted in accordance with the present invention is illustrated and generally indicated by the reference character 610, it being again noted that component parts of this embodiment which are similar to corresponding parts of the previous embodiments are designated by similar reference characters except that such reference characters are in the 600 series. More particularly, in accordance with this sixth embodiment 610 of the rotary damper gear system of the present invention, a support arm or bracket 612 is provided with an aperture 618 through which a fastener may be inserted so as to permit support arm or bracket 612 to be pivotably mounted upon a wall portion 619 of a closure housing. The support arm or bracket 612 is provided with a platform or support surface 620 upon which a damper gear 614 is rotatably mounted, gear 614 being adapted to be selectively enmeshed with or disengaged from a gear rack 616 which is an integral part of a closure member 617.

It is thus seen that this sixth embodiment of the present invention is somewhat similar to that first embodiment of the invention as disclosed in FIGS. 5a and 5b, however, in accordance with the particular structure unique to this embodiment of the invention, the bracket or support arm 612 includes an additional pair of control arms 640 and 642 which are disposed substantially parallel to each other and extend substantially perpendicular to an axis 644 which passes through the pivotal axis of support arm 612 as defined through aperture 618 and the rotary axis of rotary damper gear 614. The control arms 640 and 642 are substantially rigid and are fixedly mounted upon or integral with support arm 612, however, the distal ends of the control arms 640 and 642 are provided with flexible or bendable finger portions 646 and 648. At the free ends of the flexible or bendable portions 646 and 648 there is provided, respectively, a detent 650 and 652. The detents 650 and 652 may take various forms as long as they operate as desired, but in the illustrated embodiment, such detents comprise, in effect, components which have oppositely disposed right triangular configurations.

In operation, when the closure member 617 is to be moved from its closed position shown in FIG. 10a to its opened position shown in FIG. 10b, when the closure member 617 and its associated gear rack 616 are pivoted or rotated in the direction as shown by the arrow Y, the free apex portion of the right-triangular detent 650 of the control arm 640 will in effect be engaged by the gear teeth of the gear rack 616, as permitted by the flexible or bendable portion 646, such that the support arm 612 and the rotary damper gear 614 are pivoted in the counterclockwise direction as denoted by the arrow Z whereby the rotary damper gear 614 is forced into enmeshed engagement with the gear rack 616 so as to control the opening of the closure member 617 in a dampened or restricted manner as desired. At this time, it is noted that the hypotenuse portion of the detent 652 is disposed almost or substantially parallel to the bottom edges of the gear teeth of the toothed gear rack 616 such that the teeth of the gear rack 616 in effect slide over such hypotenuse portion of the detent 652, as well as pass by or over the free apex portion of the detent 652, without any interference or resistance to its movement in the direction of arrow Y.

Alternatively, when the closure member 617 is to be moved from its opened position shown in FIG. 10b to its closed position shown in FIG. 10a, the closure member 617 and the gear rack 616 are rotated or pivoted in the direction denoted by arrow AA as shown in FIG. 10a as a result of which the detents 650 and 652 are moved to the right as permitted by bendable or flexible portions 646 and 648 and the free apex portion of the detent 652 is engaged by the teeth of gear rack 616 so as to pivot the support arm 612 and the rotary damper gear 614 in the direction of arrow BB whereby damper gear 614 is disengaged from gear rack 616. At this time the hypotenuse portion of detent 650 is disposed substantially parallel to the bottom edge portions of teeth of gear rack 616 such that the gear teeth slide or pass thereover, as well as the free apex portion of the detent 650, without encountering any resistance to the closing movement of the closure member 617. The disposition of the control arm 640, and its associated bendable or flexible portion 646 and detent 650, serve to limit the extent to which the rotary damper gear 614 is disengaged from the gear rack 616 when the closure member 617 is moved to its closed position.

It is thus seen that in accordance with the various embodiments of the present invention, a new and improved oneway pivoting gear damper system has been provided which is not only able to be incorporated within or upon a closure member so as to meet space requirements, constrictions, or restrictions, but in addition, the damper system is always able to be effectively engaged with the gear rack of the closure member when the latter is being opened so as to control the opening movement of the closure member in a dampened manner and at a restricted rate of speed, and to be effectively or ensuredly disengaged from the gear rack of the closure member so as to permit undampened or unrestricted closure of the closure member.

Obviously, many modifications and variations of the present invention are possible in light of the above teachings. It is therefore to be understood that within the scope of the appended claims, the present invention may be practiced otherwise than as specifically described herein.

We claim:

1. A one-way damping system, comprising:

a closure housing;

a closure member movably mounted upon said closure housing for movement in a first direction toward an opened position with respect to said closure housing, and for movement in a second direction toward a closed direction with respect to said closure housing;

gear means, comprising a gear rack portion having a plurality of gear teeth defined thereon, fixedly mounted upon said closure member for movement with said closure member as said closure member is moved between said opened and closed positions with respect to said closure housing;

rotary damper means movably mounted upon said closure housing for movement between a first position at which said rotary damper means is operatively engaged with said gear means of said closure member for damping the movement of said closure member when said closure member is moved in said first direction toward said opened position with respect to said closure housing, and a second position at which said rotary damper means is operatively disengaged from said gear means of said closure member for permitting undampened movement of said closure member when said closure member is moved in said second direction toward said closed position with respect to said closure housing; and means operatively connected to said rotary damper means for engaging said gear rack portion and said gear teeth of said gear means so as to cause said rotary damper means to be moved to said first position at which said rotary damper means is operatively engaged with said gear means of said closure member and thereby dampen said movement of said closure member in response to said closure member being moved in said first direction toward said opened position with respect to said closure housing, and for engaging said gear rack portion and said gear teeth of said gear means so as to cause said rotary damper means to be moved to said second position at which said rotary damper means is operatively disengaged from said gear means of said closure member, so as to permit undampened movement of said closure member, in response to said closure member being moved in said second direction toward said closed position with respect to said closure housing.

2. A system as set forth in claim 1, further comprising:

a support arm pivotally mounted upon said closure housing; and said rotary damper means is rotatably mounted upon said support arm.

3. A system as set forth in claim 2, further comprising:

control arm means mounted upon said support arm for controlling said engagement and disengagement of said rotary damper means with respect to said gear means of said closure member.

4. A system as set forth in claim 3, wherein:

said control arm means comprises a pair of control arms having means thereon for respectively engaging said gear means of said closure member depending upon said movement of said closure member in said first and second directions so as to respectively cause said rotary damper means to be engaged with and disengaged from said gear means of said closure member.

5. A system as set forth in claim 1, further comprising:

idler gear means for engagement with said gear means of said closure member for controlling said engagement and disengagement of said rotary damper means with respect to said gear means of said closure member.

6. A system as set forth in claim 5, further comprising:

a support arm pivotally mounted upon said closure housing; and said rotary damper means and said idler gear means are both rotatably mounted upon said support arm.

7. A system as set forth in claim 5, further comprising:

a lever arm translatably mounted upon said closure housing; and said rotary damper means and said idler gear means are both rotatably mounted upon said lever arm.

8. A system as set forth in claim 5, wherein:

said idler gear means is rotatably mounted upon said closure housing about an axis; and said rotary damper means is mounted upon a support arm which is pivotable about said axis of said idler gear means.

9. A system as set forth in claim 5, further comprising:

a link arm pivotably mounted upon said closure housing; and said rotary damper means and said idler gear means are both rotatably mounted upon said link arm.

10. A one-way damping system, comprising:

a closure housing;

a closure member movably mounted upon said closure housing for movement in a first direction toward an opened position with respect to said closure housing, and for movement in a second direction toward a closed direction with respect to said closure housing;

gear means, comprising a gear rack portion having a plurality of gear teeth defined thereon, integrally molded upon said closure member for movement with said closure member as said closure member is moved between said opened and closed positions with respect to said closure housing;

rotary damper means movably mounted upon said closure housing for movement between a first position at which said rotary damper means is operatively engaged with said gear means of said closure member for damping the movement of said closure member when said closure member is moved in said first direction toward said opened position with respect to said closure housing, and a second position at which said rotary damper means is operatively disengaged from said gear means of said closure member for permitting undampened movement of said closure member when said closure member is moved in said second direction toward said closed position with respect to said closure housing; and means operatively connected to said rotary damper means for engaging said gear rack portion and said gear teeth of said gear means so as to cause said rotary damper means to be moved to said first position at which said rotary damper means is operatively engaged with said gear means of said closure member and thereby dampen said movement of said closure member in response to said closure member being moved in said first direction toward said opened position with respect to said closure housing, and for engaging said gear rack portion and said gear teeth of said gear means so as to cause said rotary damper means to be moved to said second position at which said rotary damper means is operatively disengaged from said gear means of said closure member, so as to permit undampened movement of said closure member, in response to said closure member being moved in said second direction toward said closed position with respect to said closure housing.

11. A system as set forth in claim 10, further comprising:

a support arm pivotally mounted upon said closure housing; and said rotary damper means is rotatably mounted upon said support arm.

12. A system as set forth in claim 10, further comprising:

idler gear means for engagement with said gear means of said closure member for controlling said engagement and disengagement of said rotary damper means with respect to said gear means of said closure member.

13. A system as set forth in claim 12, further comprising:

a support arm pivotally mounted upon said closure housing; and said rotary damper means and said idler gear means are both rotatably mounted upon said support arm.

14. A one-way damping system, comprising:

a closure housing;

a closure member movably mounted upon said closure housing for movement in a first direction toward an opened position with respect to said closure housing, and for movement in a second direction toward a closed direction with respect to said closure housing;

gear means, comprising a gear rack portion having a plurality of gear teeth defined thereon, fixedly mounted upon one of said closure housing and said closure member components;

rotary damper means movably mounted upon the other one of said closure housing and closure member components for movement between a first position at which said rotary damper means is operatively engaged with said gear means for damping the movement of said closure member when said closure member is moved in said first direction toward said opened position with respect to said closure housing, and a second position at which said rotary damper means is operatively disengaged from said gear means for permitting undampened movement of said closure member when said closure member is moved in said second direction toward said closed position with respect to said closure housing; and means operatively connected to said rotary damper means for engaging said gear rack portion and said gear teeth of said gear means so as to cause said rotary damper means to be moved to said first position at which said rotary damper means is operatively engaged with said gear means and thereby dampen said movement of said closure member in response to said closure member being moved in said first direction toward said opened position with respect to said closure housing, and for engaging said gear rack portion and said gear teeth of said gear means so as to cause said rotary damper means to be moved to said second position at which said rotary damper means is operatively disengaged from said gear means, so as to permit undampened movement of said closure member, in response to said closure member being moved in said second direction toward said closed position with respect to said closure housing.

15. A system as set forth in claim 14, further comprising:

a support arm pivotally mounted upon the other one of said closure housing and closure member components; and said rotary damper means is rotatably mounted upon said support arm.

16. A system as set forth in claim 14, further comprising:

idler gear means for engagement with said gear means for controlling said engagement and disengagement of said rotary damper means with respect to said gear means.

17. A system as set forth in claim 16, further comprising:

a support arm pivotally mounted upon the other one of said closure housing and closure member components; and said rotary damper means and idler gear means are both rotatably mounted upon said support arm.

18. A system as set forth in claim 14, wherein:

said gear means is fixedly mounted upon said closure member.

* * * * *